United States Patent [19]

Mayne et al.

[11] 3,790,929
[45] Feb. 5, 1974

[54] SKIP-SPREAD METHOD FOR SEISMIC SURVEYING

[75] Inventors: William Harry Mayne; Thomas R. Crump, both of San Antonio, Tex.

[73] Assignee: Petty Geophysical Engineering Company, San Antonio, Tex.

[22] Filed: Oct. 19, 1971

[21] Appl. No.: 190,478

[52] U.S. Cl.... 340/15.5 MC, 340/7 R, 340/15.5 CP
[51] Int. Cl................................................. G01v 1/24
[58] Field of Search........... 340/15.5 CP:15.5 MC, 7

[56] References Cited
UNITED STATES PATENTS

| | | | |
|---|---|---|---|
| 3,437,989 | 4/1969 | Proffitt | 340/15.5 MC |
| 3,105,568 | 10/1963 | Jolly | 340/15.5 MC |
| 3,352,377 | 11/1967 | Cetrone et al. | 340/15.5 MC |
| 3,412,373 | 11/1968 | Ellis | 340/15.5 MC |

*Primary Examiner*—Samuel Feinberg
*Assistant Examiner*—H. A. Birmiel
*Attorney, Agent, or Firm*—Tom Arnold et al.

[57] ABSTRACT

A method of seismic data acquisition wherein the average speed of data acquisition is rapid and the time and total cost necessary for data acquisition are maintained at relatively low levels. A seismic cable may be towed during an activated portion of its travel at a speed sufficiently slow to achieve optimum results of data acquisition and may be towed at a much greater speed during a deactivated portion of its travel thereby causing its average towing speed to be faster than is ordinarily practicable thereby reducing costs of data acquisition without adversely affecting the quality of the seismic data acquired.

18 Claims, 11 Drawing Figures

□ PROFILE MARKER

° REFLECTION POINT

MOVEOUT ERRORS READILY APPARENT ON THESE TRACES

□ PROFILE MARKER
∘ REFLECTION POINT

SKIP-SPREAD METHOD FOR SEISMIC SURVEYING

BACKGROUND OF THE INVENTION

This invention relates to seismic data acquisition and more particularly to marine seismic data acquisition that is accomplished in such manner as to achieve horizontal stacking data acquisition techniques at rapid speed and low cost. The invention relates to both marine and land surface techniques, but for purposes of simplicity will be discussed primarily as it relates to seismic exploration in a marine environment.

In marine seismic data acquisition, it is customary to employ a seismic cable having a plurality of detectors, which may also be referred to as hydrophones, located along the length thereof which are capable of detecting seismic waves being transmitted through earth formation and through a body of water. The seismic cable with its detectors is towed through the water by a vessel and is frequently referred to in the industry as a "seismic spread".

In operation, using the "reflection" method, a seismic wave is generated in the vicinity of the seismic spread, which seismic waves or shock waves, as they are frequently referred to, travel through the water to the bottom of the body of water and are reflected back to the hydrophone detectors which sense the reflected waves and cause recording apparatus to record a number of points corresponding to the number of active recording channels connected at any one time to various ones of the hydrophones. The seismic waves may be generated by detonating an explosive substance such as dynamite in the water or in the earth or by impacting the earth with a weight device. Seismic waves may also be generated accoustically by any of a number of commercially acceptable means. The length of the subsurface profile reflected is generally equal to one-half of the overall spacing of the active hydrophones in the hydrophones spread in view of the geometric pattern of the reflected waves that are detected by the hydrophones. Geological formations below the floor or bed of the body of water may also be detected through reflections at earth surfaces where the density or other properties of the strata undergo abrupt changes.

It has generally been the practice to generate a seismic wave or shot point at a location offset from the line of hydrophones and at a position intermediate the extremities of the seismic spread, although the specific relation of a shot point to the seismic spread may be varied in accordance with the type of seismic data to be acquired. Where a seismic cable is towed, it may be appropriate to generate the shot point at a specific point relative to the spread and therefore the seismic wave generation device may be physically connected to the seismic cable.

The vessel towing the seismic spread may stop briefly while the seismic wave generation and recording is accomplished or it may be practical to continue movement of the seismic spread at a relatively slow speed and compensate mathematically for discrepancies in the data acquired that might result due to such movement.

Where the seismic spread is continually towed through a body of water during generation of seismic waves and recording, a certain amount of noise is created by movement of the seismic spread and this noise is detected by the hydrophones and relayed to the recording equipment where it may interfere with seismic data being reflected from the ocean bottom and from various subsurface strata. Consequently, it is necessary to maintain movement of the seismic spread through the water at a constant and relatively low speed at which an acceptably low noise level is produced. It is obvious that the average speed of a seismic traverse conducted at a slow constant speed will be correspondingly limited and the cost of seismic data acquisition will be relatively high.

During seismic exploration, it has been found desirable to employ a data acquisition technique generally referred to as the "common reflection point stacking" method to eliminate the false seismic indications occasionally produced by multiple reflections that may occur when there exists a sharp discontinuity both at the bottom of the ocean and at a dominant strata below the bottom of the ocean. Under these adverse conditions seismic waves pass through the bottom of the ocean and are reflected from the dominant strata back to the bottom or surface of the ocean and then the seismic waves are reflected by the bottom or surface downwardly again to the dominant strata and they are finally reflected upwardly through the ocean floor to the hydrophone array. Multiple reflections of this nature give a false indication of an additional discontinuity located below the dominant strata by a distance equal to the spacing between the ocean floor and the dominant strata. Such multiple reflections also frequently override and obscure primary reflections from deep strata. The common reflection point stacking technique is also employed to reduce the effects of towing noise as the seismic spread is towed through the water. The noise created by rapid movement of a hydrophone spread through a body of water, of course, also complicates the common reflection point stacking technique and generally requires the towing speed to be quite low.

It is, accordingly, a primary object of the present invention to provide a novel method of seismic data acquisition involving the towing of a seismic spread that allows overall increase in towing speed of a seismic spread without increasing noise level above an optimum value.

It is an even further object of the present invention to provide a novel method of marine seismic data acquisition that allows data acquisition to be accomplished at constant acceptably slow speed, producing minimum towing noise, thereby producing optimum data acquisition results.

Among the several objects of the present invention, is noted the contemplation of a novel method of marine seismic data acquisition that is accomplished by employing the horizontal stacking technique and yet maintains average speed of towing a seismic spread at a high rate without creating excessive noise during periods of data acquisition.

It is another object of the present invention to provide a novel method of marine seismic data acquisition that achieves optimum horizontal noise cancellation due to close spacing of the traces.

It is an even further object of the present invention to provide a novel method of marine seismic data acquisition that allows employment of the common reflection point stacking technique and high speed of traverse without increasing spacing between common reflection point files.

It is an even further object of the present invention to provide a novel method of marine seismic data acquisition that is capable of achieving efficient velocity analysis.

Another object of the present invention contemplates the provision of a novel method of marine seismic data acquisition that achieves multiple coverage without sacrificing speed of the seismic traverse or quality of the seismic data acquired.

It is an even further object of the present invention to provide a novel method of marine seismic data acquisition wherein seismic data is acquired at a rapid rate thereby reducing resultant cost of seismic data acquired.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

THE PRIOR ART

Since the granting of U.S. Pat. No. 2,732,906 in 1956, many patents have been granted on various methods of recording and combining seismic data to achieve multiple fold stacked data. For example, the recorded traces may be weighted or mixed in order to achieve a more continuous sequence of events as taught by Ehlert et al. in Pat. No. 3,181,643 or different dipped angles of the reflecting beds may be determined and utilized to identify the reflections prior to the combining of seismic data into a stacked section as set forth in the patent to Mendenhall et al. No. 3,217,828. Alternatively, as taught by the patent to Strange, No. 3,133,262, multiple spreads may be employed having differing detector intervals at different water depths to record deep or shallow reflections.

SUMMARY OF THE INVENTION

A preferred method of seismic data acquisition according to the present invention may be accomplished either on land or in a marine environment although the invention is particularly directed to use of the method in a marine environment for purposes of simplicity. The method may include the provision of a seismic spread having a greater number of detector stations thereon than the number of active recording channels to be employed for data acquisition during any given recording. The active recording channels are connected to selected ones of the detector stations and after each seismic wave generation and recording sequence, the active recording channels are mechanically or electronically switched to different detector stations in a prescribed manner upon successive shots to generate seismic waves. The active recording channels are switched to different detector stations on successive shots in such manner as to obtain a desired fold of multiplicity on a stationary subsurface coverage from a series of closely spaced records taken as the seismic spread and source of seismic waves generation are towed at a constant but acceptably slow speed. In use of the method of this invention, desired multiplicity will be obtained over a subsurface distance equal to one-half of the length of the seismic spread and therefore, it will be possible to skip the recording of data over a distance equal to one-half of the length of the seismic spread. Since no recordings are being made during the skipped phase, the rate of tow can be increased significantly over the nonrecorded distance with a corresponding increase in overall average speed without adverse affect on the records that otherwise might occur due to excessive noise caused by towing the seismic spread through a body of water.

Alternative forms of this invention do not require a greater number of detector stations than the number of active recording channels and therefore would not necessarily employ a switching means.

BRIEF DESCRIPTION OF THE DRAWINGS

So that the manner in which the above recited features, advantages and objects of the present invention, as well as others which will become apparent, are attained and can be understood in detail, more particular description of the invention, briefly summarized above, may be had by reference to the preferred embodiments thereof illustrated in the appended drawings, which drawings form part of this specification.

It is to be noted, however, that the appended drawings illustrate only typical embodiments of the invention and are therefore not to be considered limiting of its scope for the invention may admit to other equally effective embodiments.

IN THE DRAWINGS

DESCRIPTION OF PREFERRED EMBODIMENTS

Figure 1:
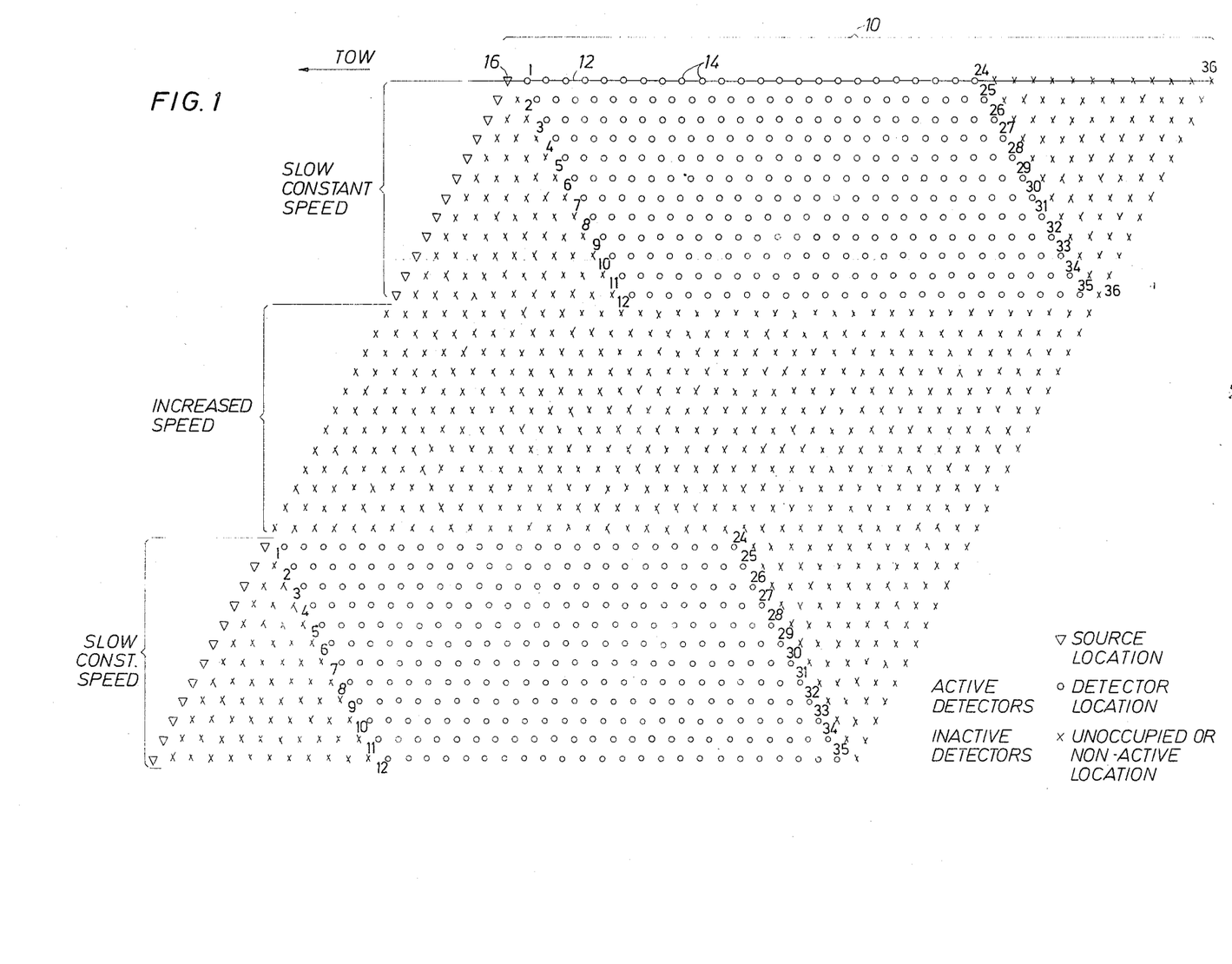
FIG. 1 is a graphic presentation of a seismic traverse according to the present invention involving 36 detector stations and illustrating movement of the source point, switching of the active recording channels, and inactive movement of the seismic spread during the traverse period.

Now referring to the drawings and first to FIG. 1, there is illustrated a seismic spread 10 comprising a seismic cable 12 having 36 seismic wave detectors situated in evenly spaced relation along the length thereof. For purposes of the present invention, any one of a number of commercially available seismic wave detectors may be employed within the scope of the present invention. Such detectors, when employed on land, are generally referred to as geophones or phones and when employed in a marine environment, are generally referred to as hydrophones.

A source 16 for the generation of seismic waves, also referred to as a shock wave, may be connected to seismic cable 12 ahead of the first one of the seismic detector stations 14. The source 16 may be any one of a number of acceptable means for generating seismic waves, such as an explosive device, an acoustical wave generating device or the like, within the scope of the present invention.

The seismic spread 10 may be towed through a marine environment by a vessel or may be propelled or otherwise manipulated in a land based environment to achieve movement in the direction of the arrow in FIG. 1. For purposes of simplicity, to facilitate understanding of the invention, discussion will be related particularly to application of the invention in a marine environment, although it is not intended that the invention be restricted to use in marine environment.

The distance between the source 16 and the first detector station is shown to be equal to the detector interval among the 36 detector locations but this particular source-to-first-detector-distance is not essential to the ends of the present invention. The distance between the source location and the first detector is not restricted to any given length (but some distance lengths will enhance the quality of a data recording). The source to first detector distance however, must remain uniform throughout any given traverse. The detectors may be spaced evenly at 200 foot intervals along the length of the seismic cable, but again this particular distance is not intended to limit the present invention, it being obvious that other detector intervals may be employed within the spirit and scope of the invention.

To produce multiple fold coverage or horizontal stacking, as such is frequently referred to in the industry, as the seismic cable is being towed through the body of water at a constant slow rate, it is desirable to generate seismic waves and detect reflected waves in such manner that multiple coverage of the subsurface is obtained. As explained in an article published in Vol. XXVII, No. 6, Part II of Geophysics (Dec. 1962) by W. Harry Mayne, and titled "Common Reflection Point Horizontal Data Stacking Techniques", the common-reflection point technique was devised to provide a practical means of increasing multiplicity to attenuate noise without increasing the subsurface area and obscuring the detail that is sought by the survey. By employing the multiple coverage, common reflection point technique, reflected signals, received along the several paths from the reflection point to the various wave detection devices, will produce a resultant sum that will be proportional to the number of signals received. Perturbations following other than the postulated ray paths will not be coincident, and hence will be degraded from the reflections.

According to the present invention, a method of obtaining such multiple fold coverage may conveniently take the form illustrated in FIG. 1 where a seismic spread is depicted in the uppermost line of FIG. 1 at the initial point of a seismic data gathering traverse with detector stations 1 through 24 activated while detectors 25 through 36 are deactivated and do not transmit reflected data to a data control facility. To facilitate activation and deactivation of the detector stations, it may be appropriate to provide a 24 channel recording circuit that may be selectively connected to the various detector stations by a stepping switch or by any other conventional switching apparatus of acceptable nature. The switching apparatus will be operative to switch sequentially after each seismic wave to successive contiguous groups of the detector stations as the seismic cable is towed through a body of water. In the alternative, it may be appropriate to continuously record from all of the 36 detector stations and subsequently electronically select information from successive contiguous groups of the detector stations in order to produce desired multiple fold coverage of the seismic data.

In line 2 of FIG. 1, the source location or source point 16 is depicted as having moved forwardly or to the left a distance equal to one-half of the detector interval while the switching apparatus has deactivated the first detector station and has activated detectors 2 through 25 and has allowed detectors 26 through 36 to remain in a deactivated state. It is apparent that while the physical movement of the seismic cable 12 in a forward direction is equal to one-half of the detector interval, the contiguous group of active detectors has moved rearward or to the right by an effective distance equal to one-half of the detector interval. The effective subsurface area covered for data reflection is therefore equal to one-half of the distance of cable movement. The seismic spread continues in its travel a sufficient distance to cause 12 source locations or source points at which time detector stations 1 through 11 will be deactivated while stations 12 through 35 will be electrically connected to the 24 channel recording circuitry.

Figure 2:
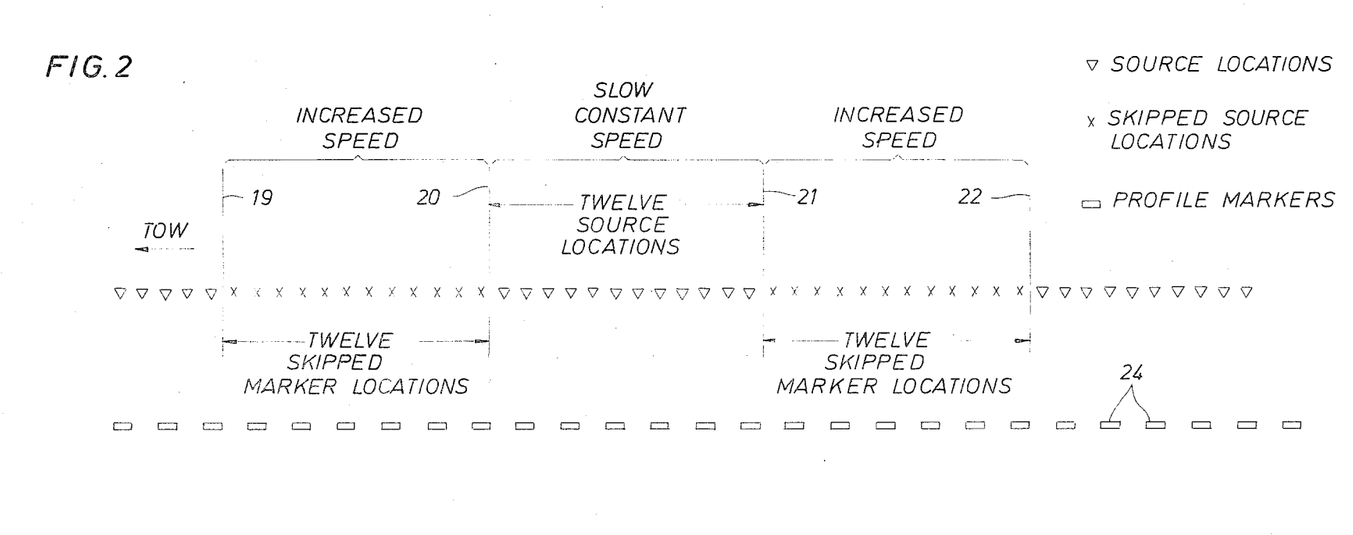
FIG. 2 is a graphic illustration of source locations during a seismic traverse conducted in accordance with the present invention.

With reference now to FIG. 2, the activated portion of the seismic traverse is indicated by small triangular symbols as the seismic spread is towed in the direction of the arrow at the left portion of FIG. 2. Vertical lines 19, 20, 21 and 22 separate the active source locations from the inactive or skipped source locations as the tow physically progresses along the path established by profile markers 24.

Figure 3:
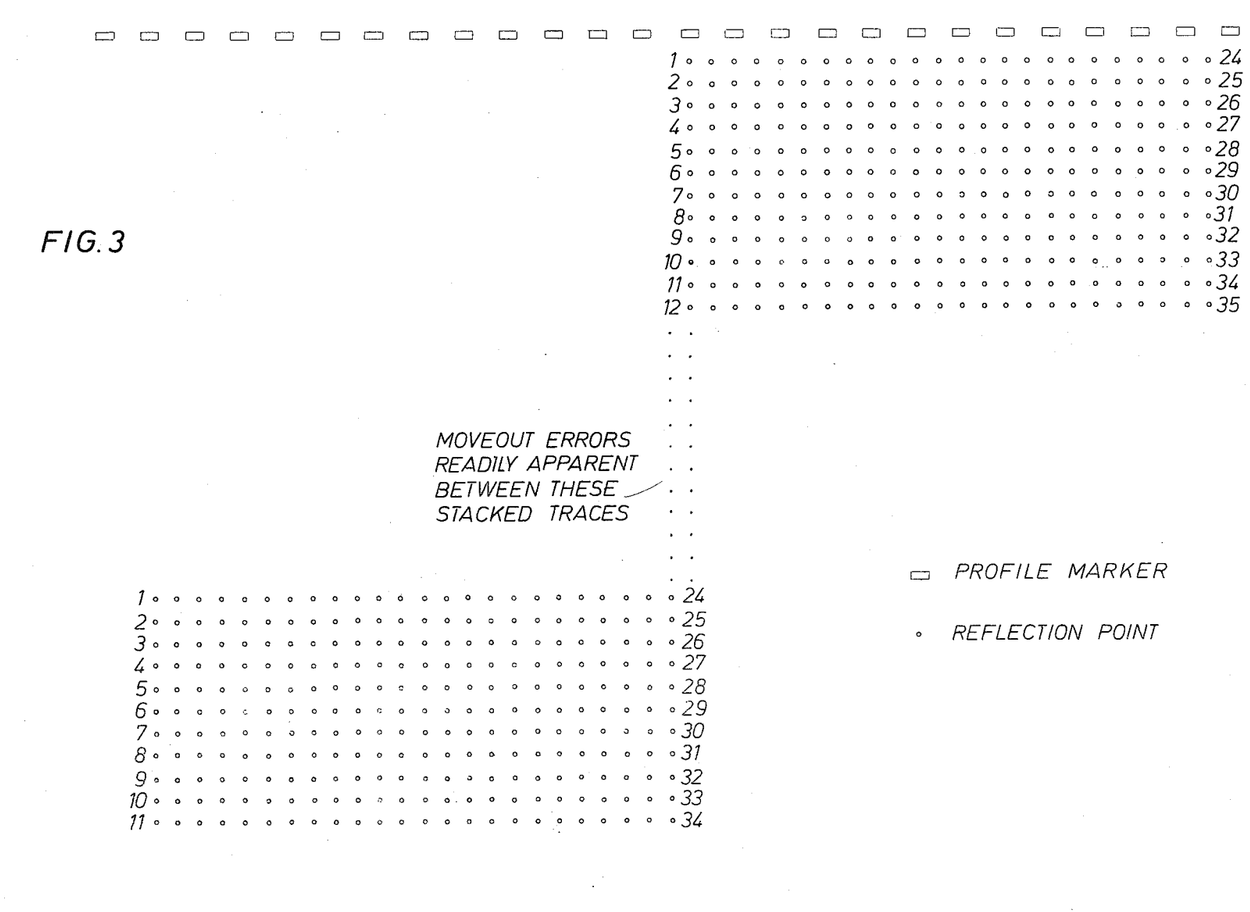
FIG. 3 is a graphic representation of reflection point data, shown to be 12-fold coverage, obtained by employing the method illustrated in FIGS. 1 and 2.

The resultant reflection point data acquired by the first 12 active source locations in FIG. 1 are depicted at the upper right portion of FIG. 3, illustrating that 12-fold coverage, which may be referred to as horizontal 12-fold horizontal stacking, is achieved by the present method of seismic data acquisition.

It is important to note that the source 16 and the seismic cable 12 continue to be towed during the active phase of seismic data acquisition (the 12 activated source locations) at a constant speed that is sufficiently slow to prevent the development of excessive noise that might otherwise interfere with effective data acquisition. By deleting traces through the mechanical circuit switching or electronic selection methods and by progressing the source and detector cable, a 12-fold stack is completed after 12 source locations have been activated. Since a 12-fold stack has been completed, it is not necessary to continue data acquisition through the succeeding 12 source locations. Accordingly, the entire seismic spread may be deactivated and the cable may be moved a distance equal to 12 source locations and seismic data acquisition may again begin with activation of detectors 1 through 24 as discussed above.

Since the seismic spread may be moved a distance equal to 12 stations in a deactivated condition, in order to increase the average speed of seismic data acquisition, it is appropriate to accelerate the speed of the vessel to the greatest practical extent during the skipped source portion of the traverse. Upon reaching the position at which seismic data acquisition may again begin, the speed of the vessel is slowed to an optimum speed for data acquisition. It is noteworthy that the source and the detector cable continue to progress the traverse at a constant moderate speed as the switching arrangement takes place and that after 12 activated source locations and 12 dead or nonshot locations are traversed at increased towing speed, the process is repeated. Thus, the source is activated 12 times as the seismic spread is moved at a constant slow speed and then 12 source locations are skipped during which period the speed of the traverse can be increased substantially, thereby effectively increasing the average speed of the total traverse and reducing the average cost of data acquired. Even though the speed of the traverse is alternately increased and slowed, stacking of the desired multiplicity is effectively obtained.

Continuous multiple fold coverage is effectively obtained primarily because the source and seismic cable continue to progress in one direction while the activated detector locations effectively move in the opposite direction at the same effective speed thereby allowing reflections from common reference points to be effectively received by the recording channels.

Figure 4:
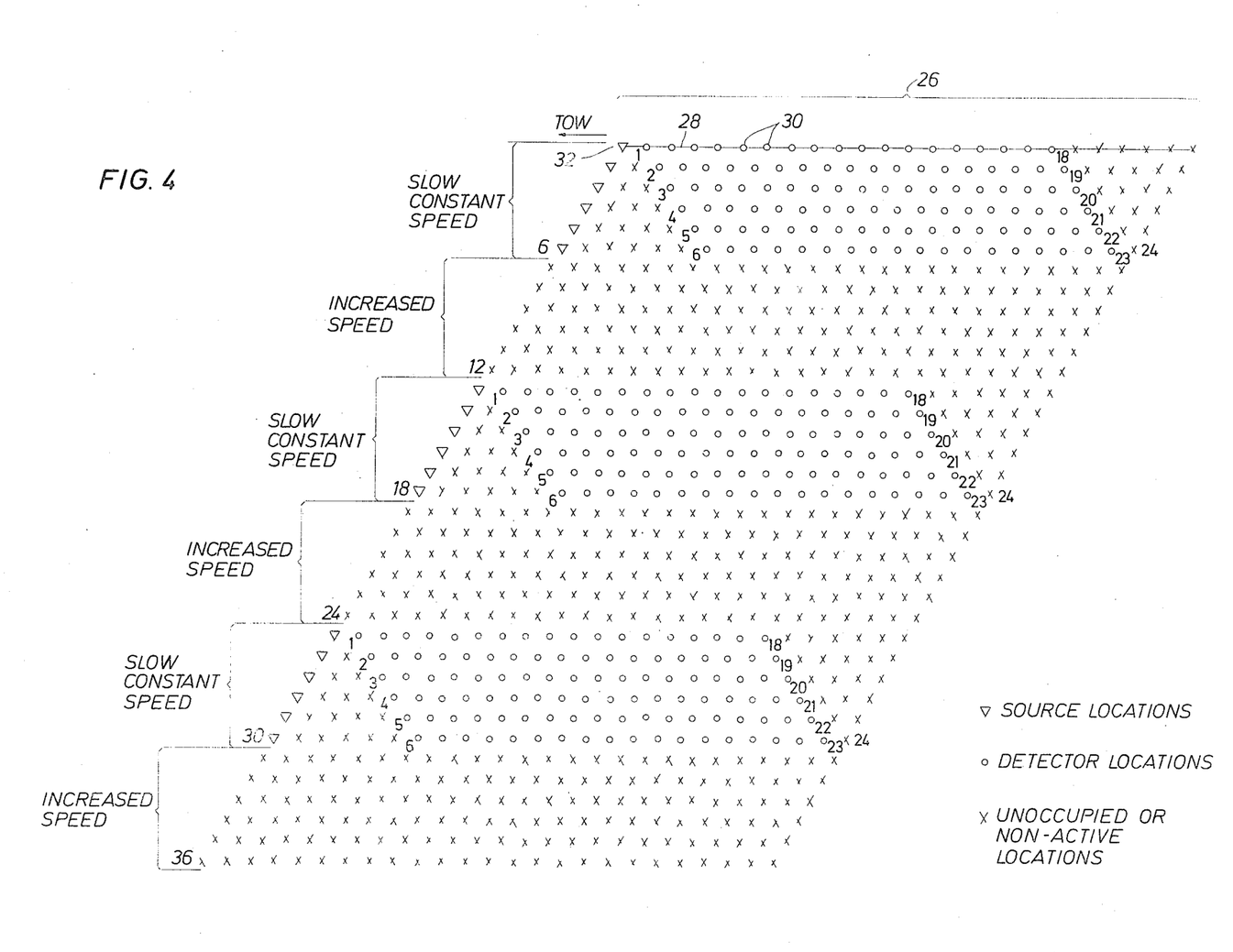
FIG. 4 is a graphic representation of an alternate method of seismic traverse according to the present invention involving 24 detector stations and illustrating movement of the source point, switching of the active recording channels and inactive movement of the seismic spread during a seismic traverse.
Figure 5:
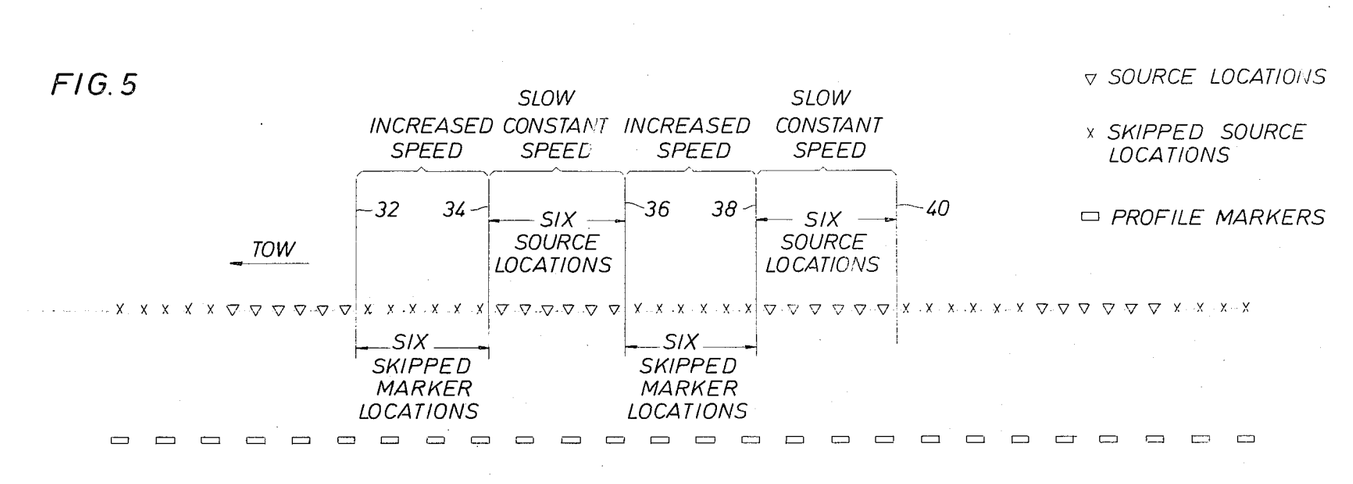
FIG. 5 is a graphic illustration of source locations during a seismic traverse conducted in accordance with FIG. 4.
Figure 6:
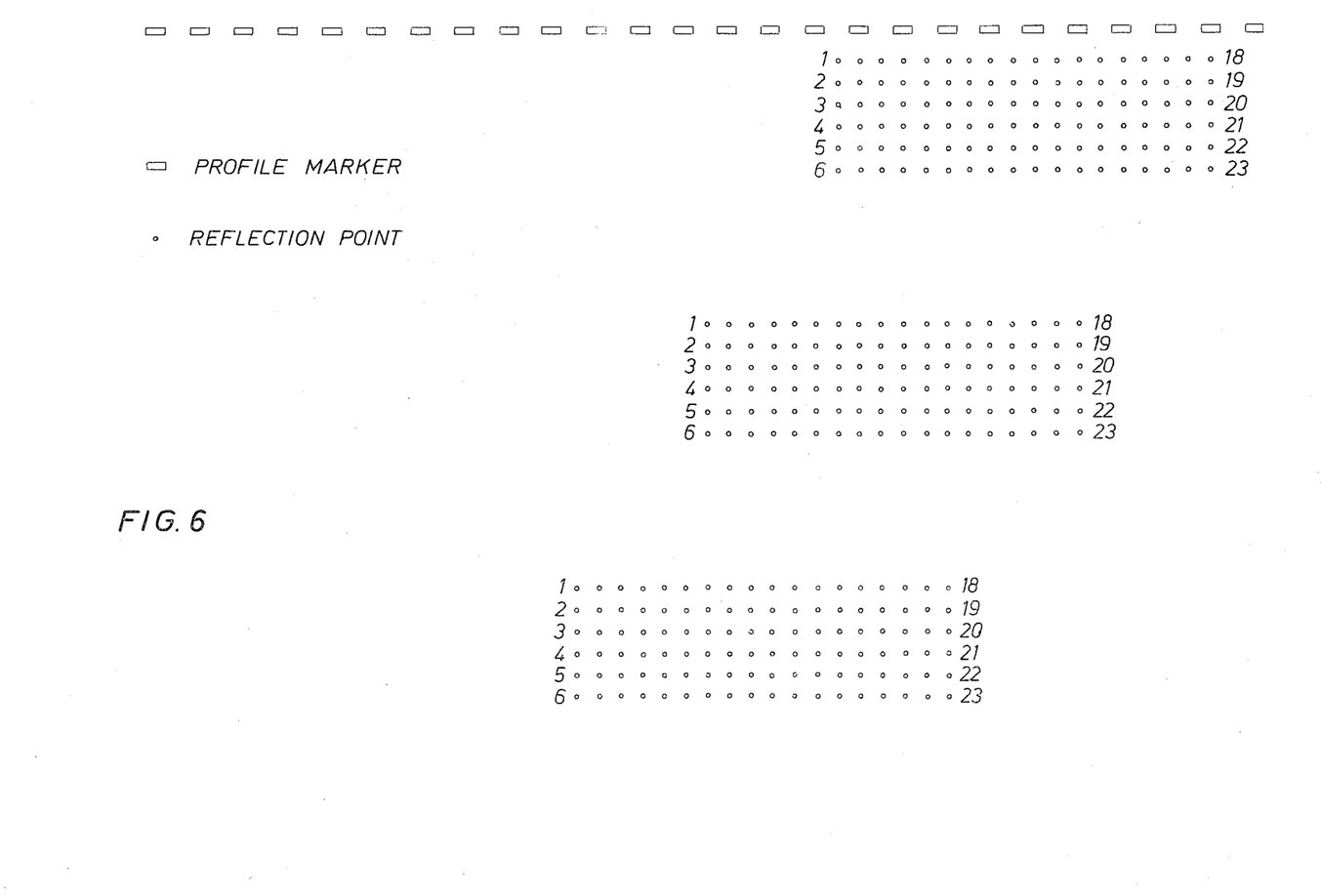
FIG. 6 is a graphic representation of reflection point data, shown to be 18-fold coverage, obtained by employing the seismic data acquisition method illustrated in FIGS. 4 and 5.

With reference now to FIGS. 4 through 6, there is depicted a modified embodiment of the skip-spread seismic traverse method of data acquisition employing 24 detector stations and achieving 18-fold multiple coverage.

A seismic spread is illustrated at 26 in FIG. 4 including a seismic cable 28 having 24 detector stations 30 connected in evenly spaced relation along the length of the cable 28. The source 32 is illustrated by small triangles to indicate graphically the position at which seismic waves are generated during traverse of the seismic cable 28 in the direction of the arrow depicted at the upper left portion of FIG. 4. The seismic data acquisition method illustrated in FIG. 4 may be referred to as the shoot-six-skip-six method, wherein a total of six active source locations are generated while the seismic cable is towed at slow constant speed by a vessel or the like. During the active source locations, a switching circuit or an electronic data selection mechanism is employed to switch a total of 18 contiguous recording channels in progressive order between each source location. As illustrated in the uppermost line of FIG. 4, the small circles indicate that detectors 1 through 18 are activated by a switching mechanism or the like while detectors 19 through 24 are deactivated. As illustrated in the second line of FIG. 4 at the second source location in the first active sequence, detector No. 1 and detectors 20 through 24 are deactivated while the switching mechanism electrically connects the detectors 2 through 19 to the 18-channel recording circuit. Switching and continuous movement of the seismic cable continues through the sixth source location, as illustrated at the sixth line in FIG. 4, where detectors 1 through 5 and 24 are shown to be deactivated while detectors 6 through 23 are electrically connected to the recording system. After this has been accomplished, the result will be a symmetrical six-fold stack as illustrated at the upper right portion of FIG. 6.

The seismic cable and source is then moved at an increased speed through a distance equal to six source locations and the seismic wave generation and recording process is again initiated with detectors 1 through 18 electrically connected to the recording circuit while detectors 19 through 24 are reactivated. During the active phase of data acquisition, the seismic cable 28 will, of course, be towed at a constant speed that is sufficiently slow to prevent excessive noise. Active source locations will continue through the next six source locations or locations 13 through 18 thereby generating seismic waves and acquiring seismic data shown in FIG. 6 as the centermost six-fold stack of seismic data.

After the second active phase of seismic data acquisition the seismic cable 28 may again be towed at rapid speed through a distance equal to six source locations at which time the speed of the traverse must again be slowed to a speed sufficiently slow for effective recording. The third active phase is again initiated at line 25 of FIG. 4 in similar manner as discussed above, thereby acquiring seismic data illustrated at the lower most six-fold stack of seismic data in FIG. 6.

As illustrated in FIG. 5, the traverse is accomplished by alternative active and inactive six source locations as the seismic cable is towed by the vessel. However, it should be noted that the speed of cable movement will be relatively slow during the active phases, shown by the small triangles, while the speed of the cable may be increased substantially during the inactive phases, indicated by small X's. The active and inactive phases are separated graphically by vertical lines 32 through 40 in FIG. 5.

With respect to FIG. 6, it is important to note that the upper, middle and lowermost six fold stack of reflection point data overlaps to define 18-fold coverage. It is also important to note, however, that the 18-fold coverage obtained is substantially higher in cost of gathering seismic data per mile of traverse, because the distance of activated consecutive source positions is half that illustrated in FIGS. 1 through 3.

Figure 7:
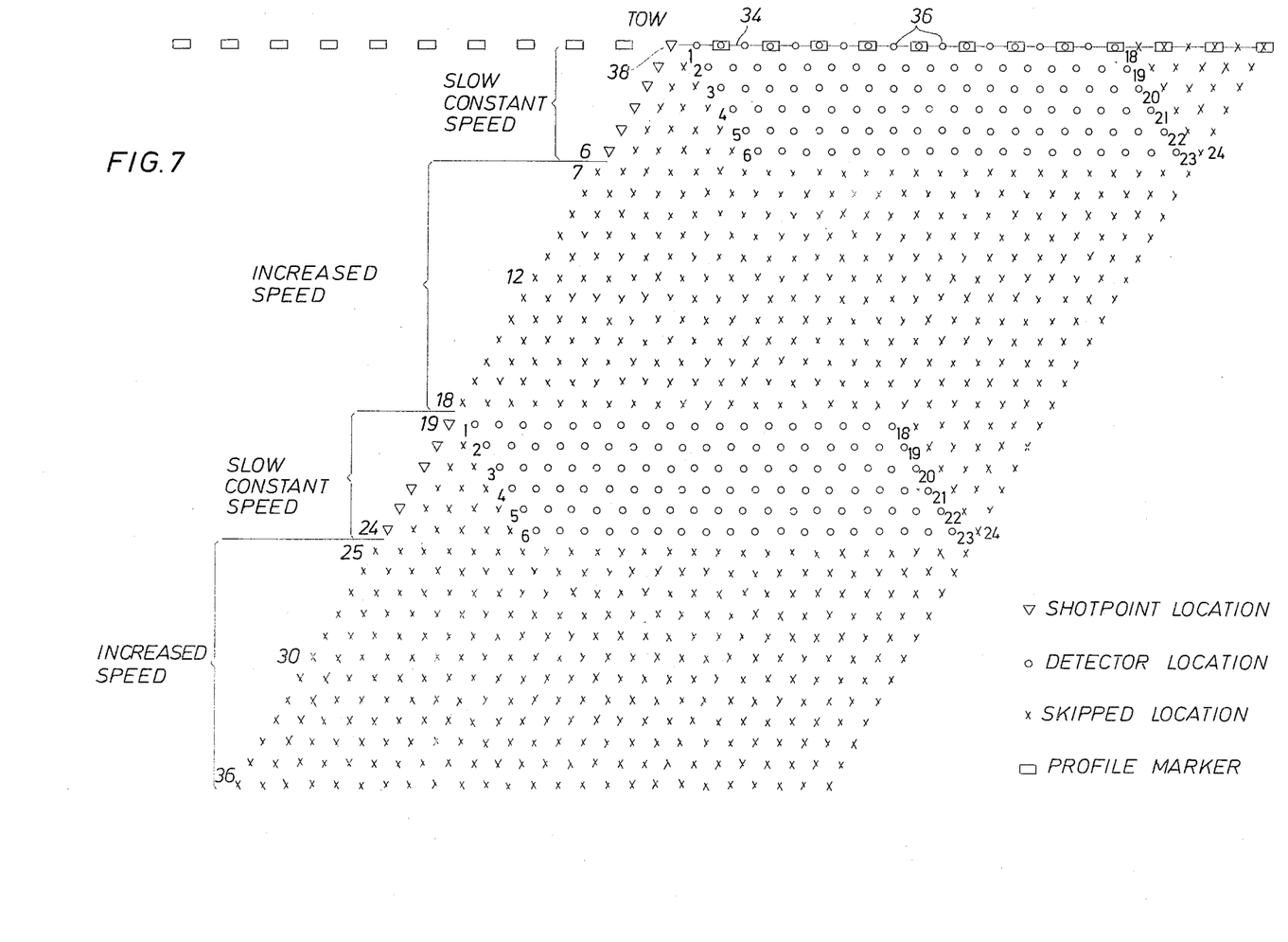
FIG. 7 is a graphic representation of a skip spread seismic traverse conducted in accordance with the present invention, involving 24 detector stations and illustrating movement of the source point, switching of the active recording channels and inactive movement of the seismic spread during a shoot-six-skip-12 seismic traverse.
Figure 8:
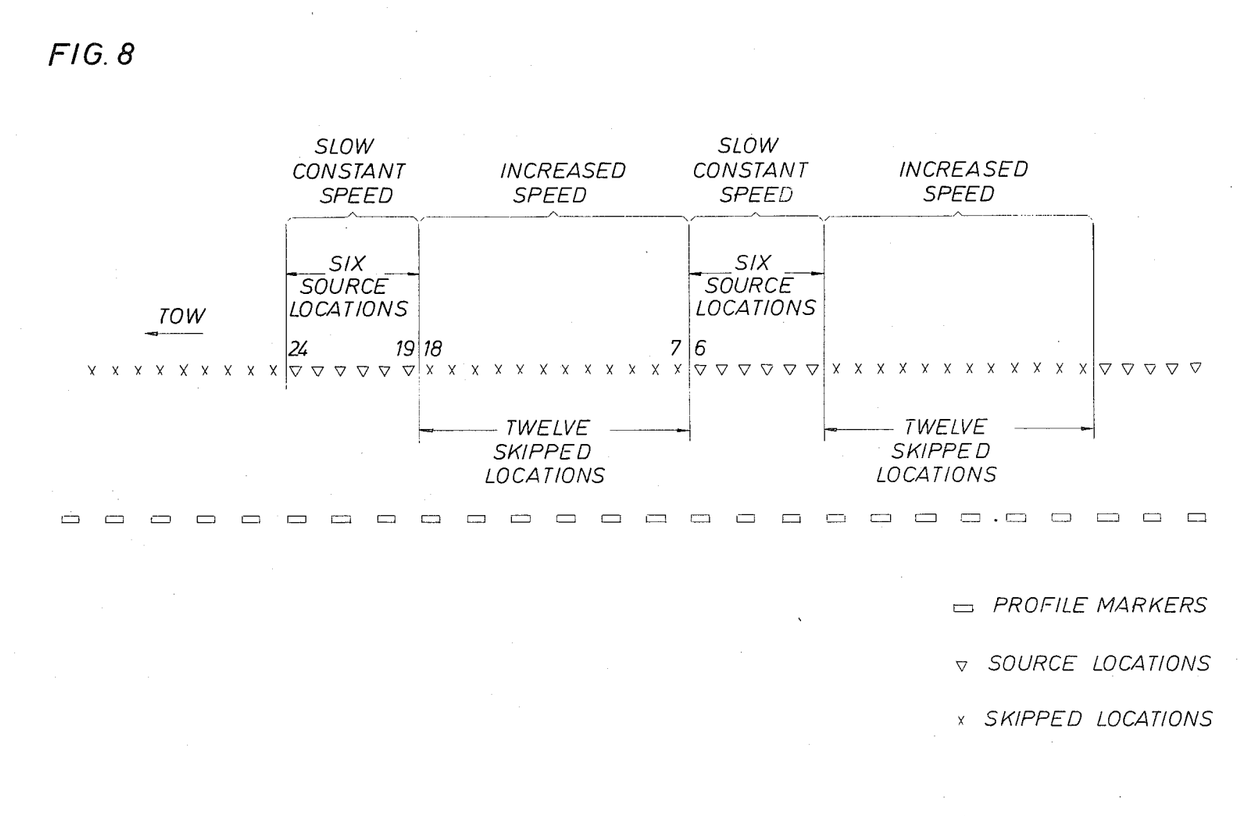
FIG. 8 is a graphic representation of source locations during the seismic traverse illustrated in FIG. 7.
Figure 9:
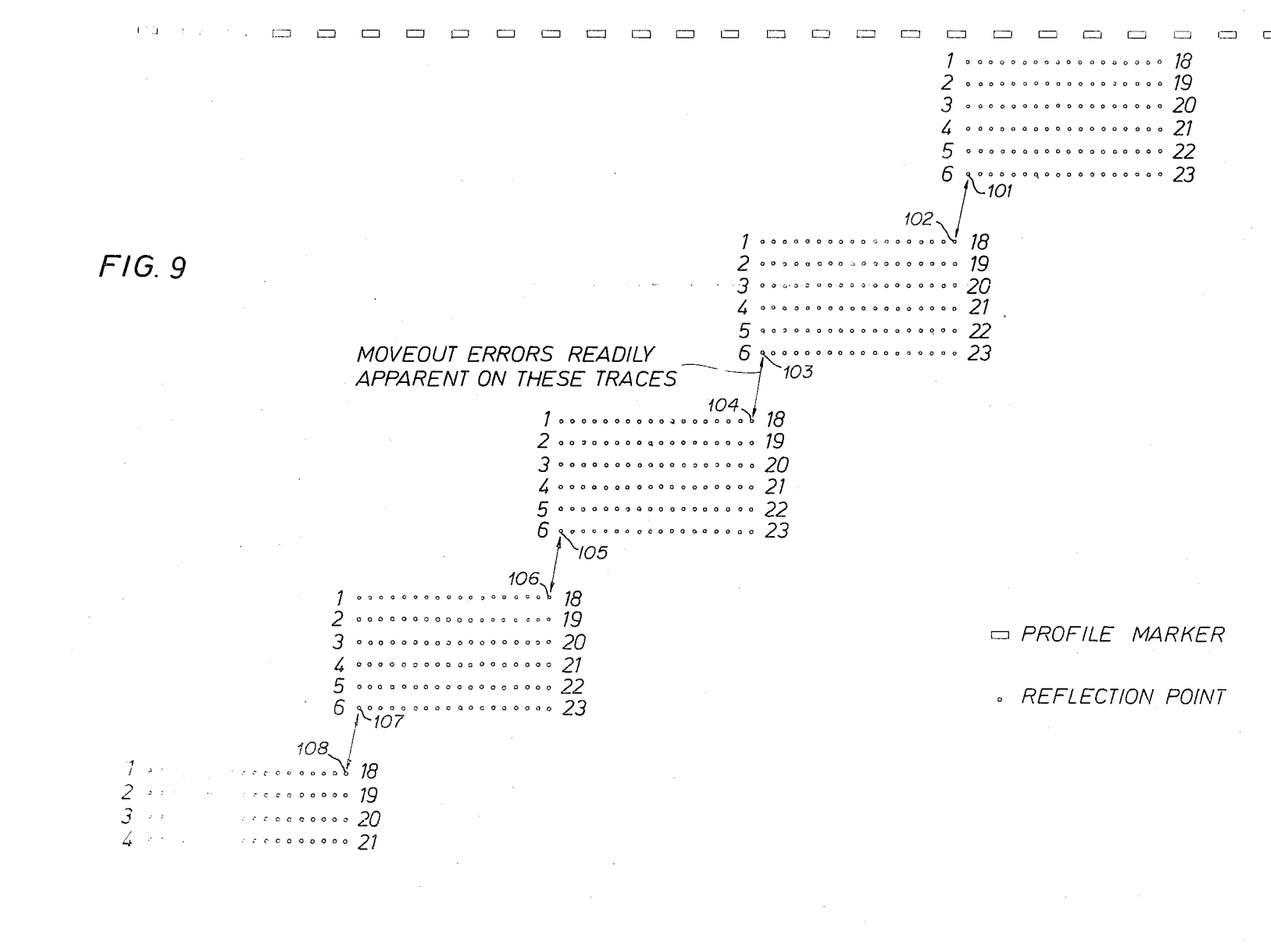
FIG. 9 is a graphic illustration of reflection point data obtained by employing the seismic data acquisition method illustrated in FIGS. 7 and 8 and shown to be six-fold multiple coverage.

With reference now to FIGS. 7 through 9, it is apparent that the method of seismic data acquisition, according to the present invention, may be employed to achieve a lesser fold coverage, and according to the present invention such lesser seismic coverage may conveniently take the form illustrated in FIGS. 7, 8, and 9 which depict a shoot-six-skip-twelve method of seismic data acquisition.

A seismic cable 34 is illustrated in FIG. 7 as being towed in the direction of the arrow by a vessel or by any other suitable towing device. The seismic cable 34 is provided with 24 detector stations 36 connected in evenly spaced relation along the length of the seismic cable. A seismic wave source 38 is depicted as being connected to the leading extremity of the seismic cable at a distance ahead of the leading detector equal to the average distance between the various detectors. The source 38, of course, may be disposed in any other suitable distance from the leading detector as might be appropriate to enhance the quality of the data recorded. It is necessary, as indicated above, that the source to first detector distance remain uniform throughout any given traverse.

As illustrated in the uppermost line of FIG. 7, a switching mechanism or electronic data selection system will be connected to receive seismic data transmitted from the first 18 of the detectors or hydrophones of cable 34. Where a switching arrangement is employed, an 18-channel recording circuit may be electrically connected to the first 18 of the detectors in order to receive seismic data transmitted therefrom and to transmit the seismic data to an appropriate recording facility for visual or electronic readout.

As illustrated in the second line of FIG. 7, the seismic cable 34 has been moved forwardly, or to the left a distance equal to one-half of the average distance between the detectors and the source 38 has been energized to generate a seismic wave. Simultaneously, the switching mechanism has operated to deenergize the first detector and detectors 20 through 24 while detectors 2 through 19 have been energized for seismic data acquisition. Seismic cable 34 continues to be towed at a speed that is constant and is sufficiently slow to prevent the development of undesirable noise. Movement of the seismic cable 34 and switching of the recording circuit will continue through line 6 where the detectors 1 through 5 and 24 will be deenergized while detectors 6 through 23 will be electrically connected to the 18-channel recording circuit. It will be observed that, after the sixth source location, as illustrated in lines 1 through 6, there will be provided six-fold multiple coverage of seismic data being received from common reflection points.

After the sixth source location, all 24 of the detectors will be deenergized as towing of the seismic cable continues through a distance equal to 12 additional source locations where the cable will be positioned as illustrated in line 18. During deenergized towing of the seismic cable 34, the speed of the tow may be increased substantially, thereby effectively reducing the total towing time necessary to move the seismic cable through a distance equal to a total of 18 source locations. As the seismic cable reaches the position illustrated in line 19 of FIG. 7, the 18-channel recording circuit will again be electrically connected to detectors 1 through 18 and the source 38 will generate a seismic wave that will be reflected by earth substrata to the first 18 detectors for recording. Seismic wave generation at the next six source locations, depicted in lines 19 through 24, will then occur with switching of the 18-channel recording circuit to the various contiguous detector groups as indicated above. After the last source location, as indicated in line 24, the entire seismic spread will be deenergized as towing continues at an increased speed through a distance equal to 12 source locations to a position illustrated in line 36 where seismic generation and switching of the detectors will again occur as towing is again slowed to a constant optimum speed as indicated above.

With reference now to FIG. 8, which graphically identifies a shoot-six-skip-12 method of seismic data acquisition, towing of the detector cable will progress as indicated by the tow arrow and seismic waves will be generated as indicated by source location triangles along a traverse defined by profile markers. Since the towing of the seismic cable may be conducted at an increased speed during a distance equal to 12 skipped locations and slowed for seismic data acquisitions during six active source locations, it is obvious that the average speed of the tow will be substantially greater than seismic data gathering at a conventional slow towing rate.

In view of the foregoing, it is apparent that the present invention provides a novel method of seismic data acquisition that effectively allows an overall increase in speed of towing a seismic spread without increasing noise level above an optimum value.

Even though the average speed of towing the seismic cable is substantially increased by employing the skip spread method of the present invention, the seismic data is gathered at a constant and acceptably slow speed thereby enhancing the value of data acquired. Even though the seismic cable might be towed at various speeds, it is practical to achieve the horizontal stacking technique of seismic data acquisition and to do so without increasing spacing between common reference point files. Moreover, the invention achieves optimum horizontal noise cancellation due to close spacing of the traces. In general, the invention effectively provides for seismic data acquisition of superior value which may be obtained at much faster rates and therefore at lower costs than has heretofore been practical. The invention therefore, is seen to attain all of the objects and advantages hereinabove set forth together with other advantages which will become obvious and inherent from a description of the instant seismic data acquisition method together with apparatus that may be employed in carrying out the method. It will be understood that certain combinations and subcombinations are of utility and may be employed without reference to other features and subcombinations. This is contemplated by and is within the scope of the present invention.

This invention is particularly applicable to a technique for identification of moveout errors. FIG. 9 illustrates the common reflection points for the methods in FIG. 7 and FIG. 8. The common reflection point 101 consists of traces having six different source-to-detector distances equal to one detector interval, two detector intervals, three detector intervals, etc., to six detector intervals. This common reflection point 101 provides a good statistical average for the moveout near the source. Common reflection point 102 consists of traces having six different source-to-detector distances which are large in comparison with source-to-detector distances for common reflection point 101. The source-to-detector distances for common reflection point 102 are 18 detector intervals, 19 detector intervals, etc., to 23 detector intervals. This provides a good statistical average of traces having long source-to-detector distances. A comparison of the traces for common reflection points 101 and 102 will disclose errors in the normal moveout as applied by conventional techniques. Similar conditions apply for common reflection points 103 and 104, 105 and 106, 107 and 108. Hence, there is a series of comparisons available along the traverse to show where moveout errors exist. Common reflection points 101 and 102 are consecutive common reflection points. A tie at the same common reflection point can be obtained by recording 25 channels instead of 24 channels. The detectors on the added channel would be detector 19 for the initial source, detector 20 for the next source, etc., to detector 24.

Figure 10:
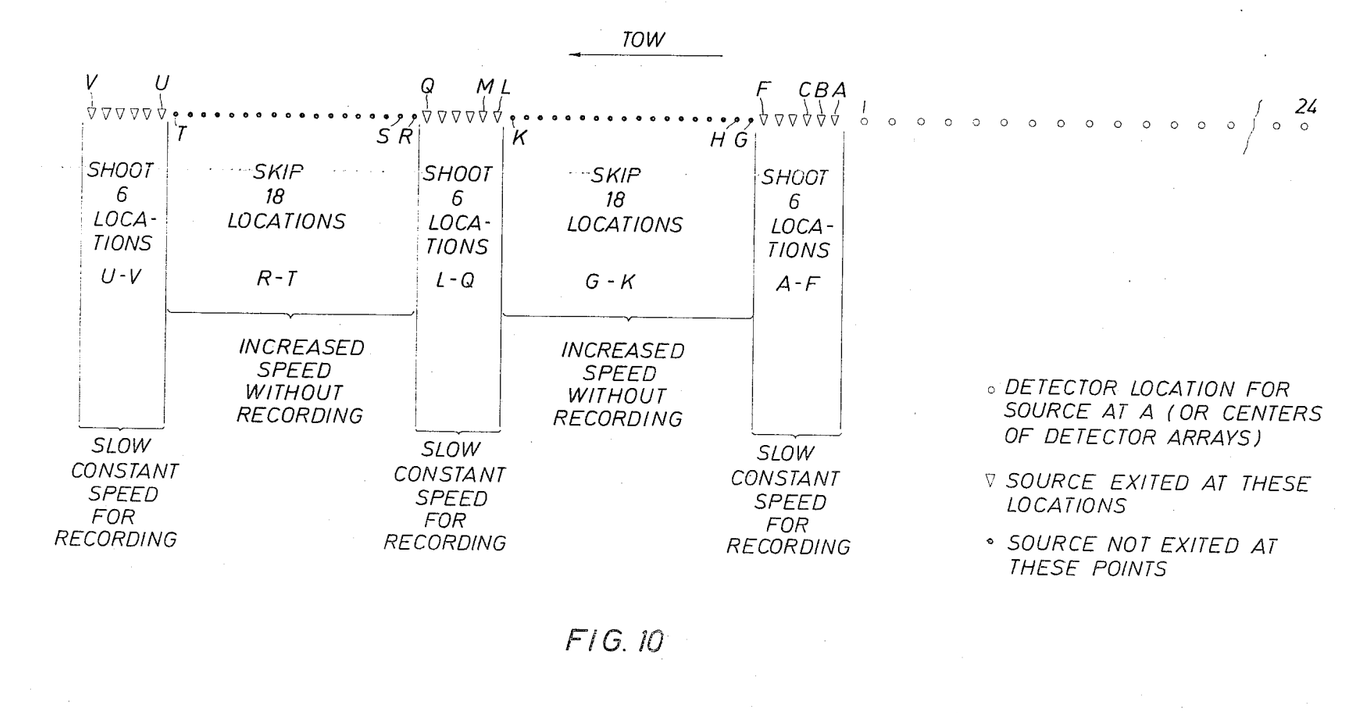
FIG. 10 is a graphical representation of an alternate mode of operation for use when the switching mechanism is not employed and the number of the detector stations is equal to the number of recording channels.
Figure 11:
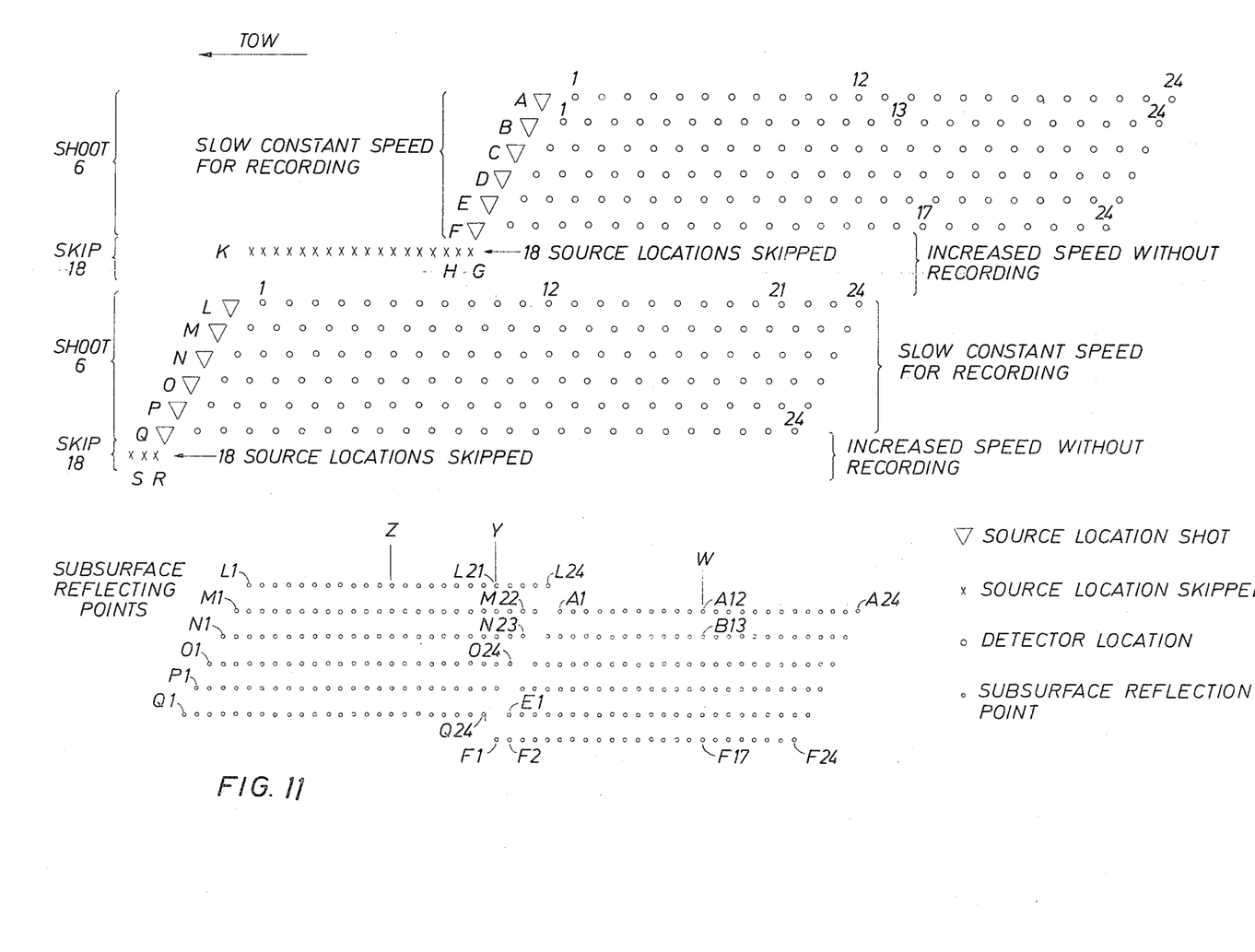
FIG. 11 illustrates the operation of the procedure in FIG. 10 and includes the subsurface reflecting points.

FIGS. 10 and 11 illustrate an alternative arrangement which employs the same number of detector stations as the number of recording channels. No switching means is employed. In this case illustrated, there are 24 detector groups and the distance from the source to the closest detector is equal to the spacing between detectors. Either of these can be modified since they are illustrative rather than restrictive. The traverse is started with the source at location A and 24 detectors, or 24 detector arrays, extending to the right of location A as illustrated in FIG. 10. The source is excited at location A and the outputs of detectors 1 through 24 are recorded in the usual manner. The source and detectors are slowly moved one-half a detector interval to the left. When the source reaches location B, the source is excited and the output of all 24 detectors, or detector arrays, are recorded. The process is repeated for location C., etc., through location F. The assembly consisting of source and detectors is then moved to the left as fast as practical past locations G, H, etc., to location K and the source is not excited at any of these 18 locations. The assembly is slowed down to a reasonable speed for recording. The source is excited at location L and the data from all 24 detectors is recorded. The assembly continues to the left at a slow constant speed, the source is excited at locations M through Q, and a recording of each source excitation is made from all 24 detectors. The speed of the assembly is then increased past locations R, S, etc., to location T. The speed is decreased to the slow constant speed for recording from locations U through V. The process is repeated along the traverse.

FIG. 11 is a detail of the initial portion of the process. The initial position is shown at the top of FIG. 11 with the source at location A and 24 detectors to the right. After the intial recording, the assembly is moved slowly to the left as incidacted by the Tow arrow, but the next source location B is indicated below the original position for clarity. A slow constant speed is used for recording through location F. The reflection point for the source at location A and detector 1, is at the midpoint between source A and detector 1 and is indicated by the small circle A1. Similar reflection points to the other detectors are to the right, such as, A12 from detector 12 and A24 from detector 24. The reflection points from the source at location B are shown slightly lower and to the left. The process continues through the source at location F indicated and the reflection points are F1 to F24. Data from a common reflection point W is indicated at A12, B13, etc., to F17. There are six of these paths, hence, six-fold coverage. Reflection points for sources at locations L through Q is indicated in the block from L1 to L24 and down to Q1 to Q24. Common reflection point Y has two reflection points from E and F and four points from L through O, namely E1, F2, L21, M22, N23 and O24. It can be observed that each common reflection point has six different reflection paths. The number of detectors could be increased to obtain an increase in multiplicity of the coverage or to decrease number of locations for sources or similar modifications. If the number of locations for sources is increased in the consecutive series of sources, such as A through F, the multiplicity of coverage would be increased but number of locations skipped would be decreased. Each detector is indicated as a detector but in practice usually an array of detectors connected together will be used in place of a single detector. The sources with the effective center of the array at the location indicated for the source location. As many possible embodiments may be made of this invention without departing from the spirit or scope thereof, it is understood that all matters hereinabove set forth or shown in the accompanying drawings are to be interpreted as illustrative and not in a limiting sense.

We claim:

1. A method of marine seismic exploration wherein a seismic spread having a plurality of seismic detectors evenly spaced along the length thereof is towed through a body of water by a vessel, said seismic spread having leading and trailing extremities, seismic data recording means being provided and including a lesser number of recording channels than the number of said seismic detectors, said method comprising:

towing said spread through the body of water at an optimum constant speed for efficient data acquisition;

generating successive seismic waves at a shotpoint fixedly located with respect to said seismic spread as said spread is moved through said body of water, said seismic waves being generated at intervals equal to selected integral multiples of one half of the spacing of said seismic detectors;

switching said recording channels at detector intervals corresponding to said selected integral multiples along said seismic spread after each seismic wave generation to a different selected group of said detectors;

continuing said seismic wave generation and switching of said recording channels during a first predetermined length of movement of said seismic spread;

discontinuing generation of seismic waves and switching of said recording channels during a second predetermined length of movement of said seismic spread; and towing said seismic spread through said body of water at a speed in excess of said optimum constant speed during said second predetermined length of movement of said seismic spread.

2. A method according to claim 1, wherein:
said first predetermined length of movement being substantially equal to one-half of the length of said seismic spread.

3. A method according to claim 1, wherein:
said second predetermined length of movement being substantially equal to one-half of the length of said seismic spread.

4. A method according to claim 1, wherein:
said first and second predetermined lengths of movement each being substantially equal to one-half of the length of said seismic spread.

5. A method according to claim 1 wherein:
the number of detectors in said selected group of said detectors being equal to the number of recording channels.

6. A method of marine seismic exploration wherein a seismic spread having a plurality of seismic detectors evenly spaced along the length thereof is towed through a body of water by a vessel, said seismic spread having leading and trailing extremities, seismic data recording means being provided and including a lesser number of recording channels than the number of said seismic detectors, said method comprising:
  towing said spread through the body of water at an optimum constant speed for efficient data acquisition;
  initiating data acquisition with said recording channels connected to the leading ones of said number of seismic detectors in said seismic spread;
  generating successive seismic waves at a shotpoint fixedly located with respect to said seismic spread as said spread is moved through said body of water;
  switching said recording channels at detector intervals corresponding to said shotpoint spacing toward the trailing extremity of said seismic spread after each seismic wave generation;
  continuing said seismic wave generation and switching of said recording channels during a first predetermined length of movement of said seismic spread;
  discontinuing generation of seismic waves and switching of said recording channels during a second predetermined length of movement of said seismic spread; and
  towing said seismic spread through said body of water at a speed in excess of said optimum constant speed during said second predetermined length of movement of said seismic spread.

7. A method according to claim 6, wherein:
said seismic waves are generated upon movement of said seismic spread a distance substantially equal to one-half of the distance between said detectors.

8. A method according to claim 7, wherein:
said switching of said recording channels comprises switching each of said recording channels one detector interval toward the trailing extremity of said seismic spread after each seismic wave generation.

9. A method of marine seismic exploration wherein a seismic spread having a plurality of seismic detector means evenly spaced along the length thereof is towed through a body of water by a vessel, said seismic spread having leading and trailing extremities, seismic data recording means being provided and including a lesser number of recording channels than the number of said seismic detectors, said method comprising:
  towing said seismic spread through the body of water at an optimum constant speed for efficient data acquisition;
  generating successive seismic waves at a shotpoint located at a particular interval ahead of the first of said seismic detector means as said seismic spread is moved through said body of water;
  initiating data acquisition with said recording channels connected to the leading ones of said number of seismic detector means in said seismic spread;
  switching each of said recording channels one detector interval toward the trailing extremity of said seismic spread after each seismic wave generation;
  continuing said seismic wave generation and said switching of said recording channels until all of said seismic detectors have been selectively activated;
  discontinuing generation of seismic waves and switching of said recording channels during a predetermined length of movement of said seismic spread through the water; and
  towing said seismic spread through said body of water at a speed in excess of said optimum constant speed during said predetermined length of movement of said seismic spread.

10. A method according to claim 9 wherein:
said predetermined length of movement of said seismic spread equals substantially one-half of the length of said seismic spread.

11. A method according to claim 9 wherein:
said shotpoint is generated at a distance ahead of the first of said group of seismic detectors equal to the average distance between said detectors of said seismic spread.

12. A method according to claim 9 wherein:
said shotpoint is generated at a distance ahead of the first of said group of seismic detectors equal to the average distance between said detectors of said seismic spread; and
said predetermined length of movement of said seismic spread equals substantially one-half of the length of said seismic spread.

13. A method of seismic exploration wherein a seismic spread having a plurality of seismic detector means evenly spaced along the length thereof is moved in one direction, said seismic spread having leading and trailing extremities, said detectors being capable of recording reflected seismic data at any time, said method comprising:
  moving said seismic spread in said one direction;
  initiating said seismic data acquisition with a contiguous group of said detector means being selected to detect and transmit seismic information for recording;
  switching said group of selected detector means an equivalent detector interval in a direction opposing said one direction subsequent to each seismic wave generation.

14. A method of seismic exploration wherein a seismic spread having a plurality of seismic detector means evenly spaced along the length thereof is moved in one direction, said seismic spread having leading and trailing extremities, said detectors being capable of recording reflected seismic data at any time, said method comprising:
  moving said seismic spread in said one direction;
  initiating said seismic data acquisition with a contiguous group of said detector means being selected to detect and transmit seismic information for recording said contiguous group of said detector means beginning with the first of said detector means;
  generating successive seismic waves at source positions being fixedly located with respect to said seismic spread as said spread is moved; and
  switching said group of selected detector means in a direction opposing said one direction subsequent to each seismic wave generation said switching being accomplished by movement of said contiguous group of said active detector means a detector interval corresponding to the detector interval of said source positions in a direction opposing movement of said spread subsequent to each seismic wave generation.

15. A method according to claim 12, wherein:
all of said detector means are active to receive and transmit seismic information;
selectively collecting data from a specific contiguous group of said detector means; and
said switching of said selected detector means being accomplished by switching said data collection one detector interval subsequent to each seismic wave generation.

16. A method of marine seismic exploration for achieving continuous multiple fold coverage of a subsurface environment wherein a seismic spread having a seismic source and a plurality of seismic detectors evenly spaced along the length thereof is towed along a traverse having uniformly spaced locations and a contiguous group of recording channels is employed to receive signals from selected contiguous groups of said seismic detectors, said method comprising:
 a. towing the seismic spread through the body of water at an optimum constant speed for efficient data acquisition;
 b. successively exciting the seismic source at a first predetermined number of consecutive uniformly spaced locations and recording the seismic signals received by the plurality of seismic detectors;
 c. switching said recording channels one detector interval along said seismic spread after each seismic excitation;
 d. increasing the speed of the seismic spread through the water without recording seismic signals from a second predetermined number of consecutive locations at uniformly spaced locations;
 e. reducing the towing speed of the seismic spread to the optimum constant speed; and
 f. successively exciting the seismic source at the first predetermined number of consecutive locations at uniformly spaced locations and recording the seismic signals received by the plurality of seismic detectors.

17. The method of claim 16 wherein steps (d), (e) and (f) are repeated along the traverse.

18. A method of seismic exploration for achieving continuous multiple fold coverage of a subsurface environment wherein a seismic spread having a seismic source and a plurality of seismic detectors evenly spaced along the length thereof is located along a traverse having uniformly spaced locations and a contiguous group of recording channels is employed to receive signals from selected contiguous groups of said seismic detectors, said method comprising:
 a. locating the seismic spread along the traverse with the source located in relation to one of the uniformly spaced locations;
 b. exciting the source and recording the signals received from a selected consecutive series of the plurality of seismic detectors;
 c. relocating the seismic spread along the traverse with the seismic source located in the same relation to the next of the uniformly spaced locations along the traverse;
 d. selecting a different consecutive series of said seismic detectors following each excitation of said source;
 e. repeating step (b) exciting the source and recording the signals received from said different consecutive series of said seismic detectors;
 f. repeating steps (c), (d) and (e) forming a first predetermined number of recordings from consecutive uniformly spaced locations;
 g. skipping a second predetermined number of consecutive uniformly spaced locations without exciting the source at the locations skipped; and
 h. successively repeating step (f) then step (g) along the traverse.

* * * * *